(12) United States Patent
Regan et al.

(10) Patent No.: US 10,720,876 B2
(45) Date of Patent: Jul. 21, 2020

(54) PHOTOVOLTAIC CONVERSION OF LIGHT

(71) Applicant: X Development LLC, Mountain View, CA (US)

(72) Inventors: William Regan, San Carlos, CA (US); Jason Rugolo, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 72 days.

(21) Appl. No.: 16/006,553

(22) Filed: Jun. 12, 2018

(65) Prior Publication Data

US 2019/0379318 A1    Dec. 12, 2019

(51) Int. Cl.
| | |
|---|---|
| *B60L 1/00* | (2006.01) |
| *H02S 10/20* | (2014.01) |
| *H02S 40/38* | (2014.01) |
| *B60L 8/00* | (2006.01) |
| *H02S 40/32* | (2014.01) |
| *H02S 10/10* | (2014.01) |

(52) U.S. Cl.
CPC ............ *H02S 10/20* (2014.12); *B60L 8/003* (2013.01); *H02S 10/10* (2014.12); *H02S 40/32* (2014.12); *H02S 40/38* (2014.12); *B60L 2200/10* (2013.01); *B60L 2200/32* (2013.01)

(58) Field of Classification Search
CPC ........................................ H02S 10/20
USPC ........................................... 307/9.1
See application file for complete search history.

(56) References Cited

U.S. PATENT DOCUMENTS

| | | | | |
|---|---|---|---|---|
| 4,135,537 | A * | 1/1979 | Blieden | ............... H01L 31/055 136/247 |
| 8,916,764 | B2 | 12/2014 | Weir | |
| 2012/0042933 | A1 | 2/2012 | Gruss et al. | |
| 2013/0314006 | A1 * | 11/2013 | Lan | ........................ B60L 8/003 318/139 |
| 2016/0093411 | A1 * | 3/2016 | Tompson, Jr. | ........... G21H 1/12 376/156 |

FOREIGN PATENT DOCUMENTS

DE           3036269 A1     5/1982

OTHER PUBLICATIONS

U.S. Appl. No. 16/042,226, Photovoltaic Battery, filed Jul. 23, 2018, 34 pages.

* cited by examiner

*Primary Examiner* — Rexford N Barnie
*Assistant Examiner* — Dru Parries
(74) *Attorney, Agent, or Firm* — Christensen O'Connor Johnson Kindness PLLC

(57) ABSTRACT

A photovoltaic power source includes a receptacle to receive a photofuel including a liquid, and one or more photovoltaic cells positioned within the receptacle to receive light emitted from the photofuel when the photofuel is in the receptacle. The photovoltaic power source also includes power circuitry coupled to the one or more photovoltaic cells to receive a photocurrent generated by the one or more photovoltaic cells when the one or more photovoltaic cells receive the light emitted from the photofuel. In response to the photocurrent, the power circuitry is coupled to output electricity.

25 Claims, 10 Drawing Sheets

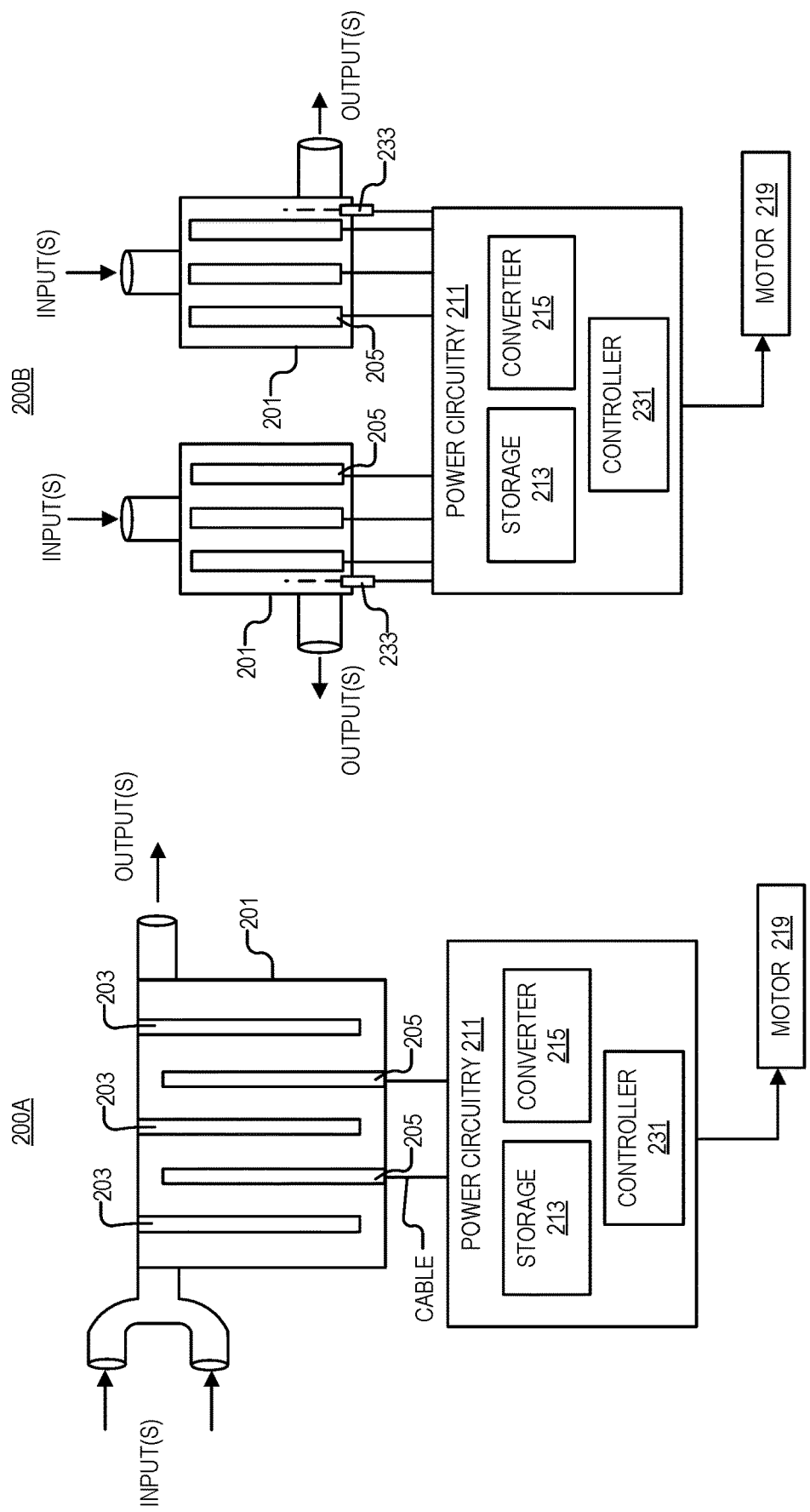

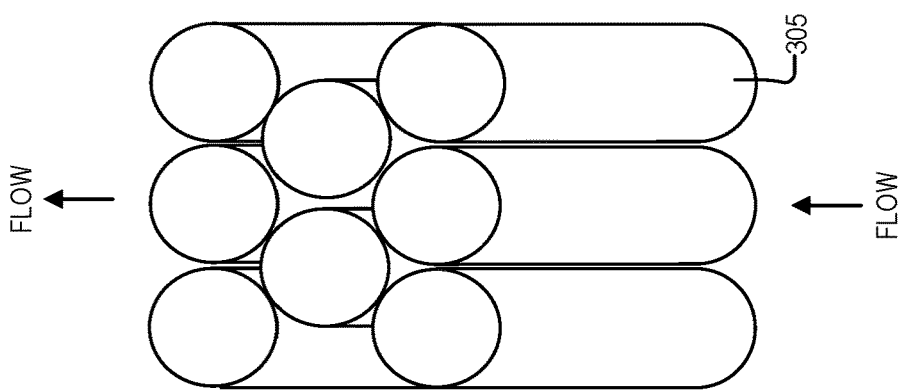
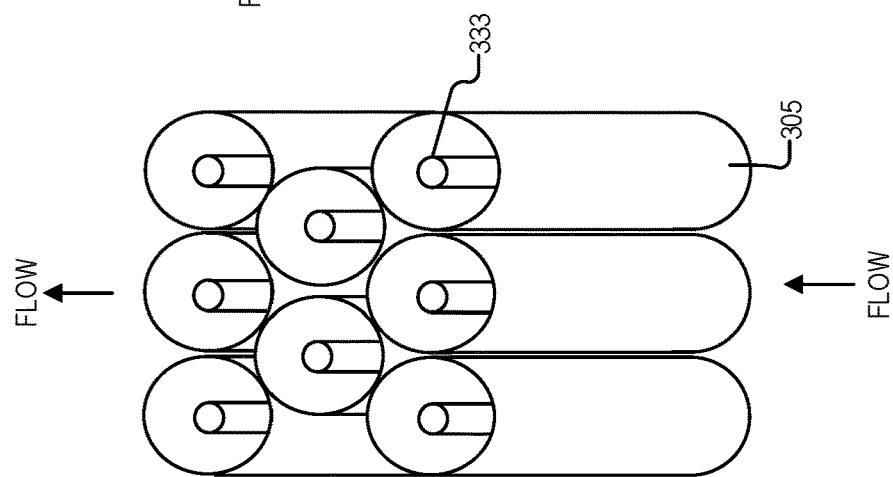
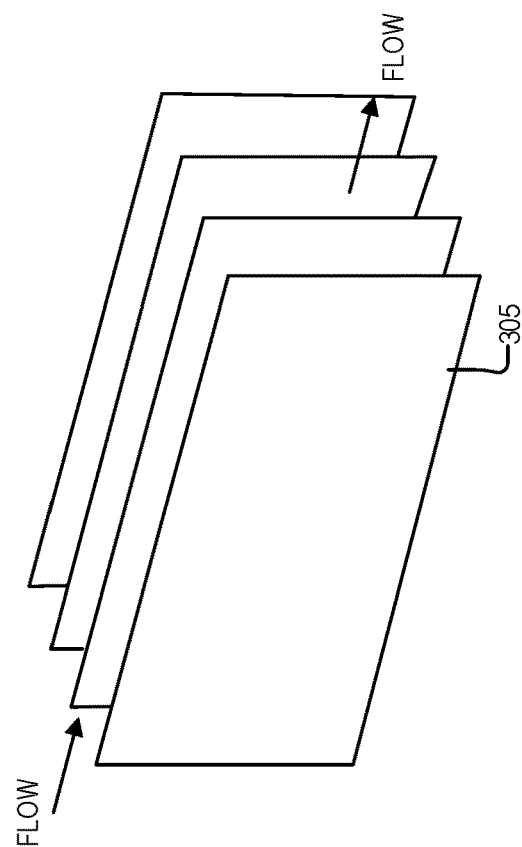

PHOTOVOLTAIC CONVERSION OF LIGHT

TECHNICAL FIELD

This disclosure relates generally to photovoltaic devices.

BACKGROUND INFORMATION

For vehicle transportation, the dominant technology is hydrocarbon combustion to drive heat engines (internal combustion engines for cars, jet engines for planes, etc.). Other nascent transportation storage technologies include closed-cell batteries, fuel cells (e.g., $H_2$ fuel cells), and longer-term possibilities for redox flow batteries for fast-refueling ground vehicles. These transportation technologies may suffer certain drawbacks that limit current or future applications: (a) fossil hydrocarbon combustion releases the greenhouse gas $CO_2$, and biofuels (low net $CO_2$) compete with food production, (b) gasoline cannot easily be "recharged" like a battery, (c) batteries are efficiently charged/discharged but are expensive, limited in energy density, and slow to recharge, (d) fuel cells are generally expensive, and (e) redox flow batteries are limited in energy density.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIGS. 2A and 2B illustrate embodiments of a photovoltaic power source, in accordance with embodiments of the disclosure.

FIGS. 3A-3F illustrate channels that may be used to direct flow of the photofuel in the photovoltaic power sources of FIGS. 2A and 2B, in accordance with embodiments of the disclosure.

DETAILED DESCRIPTION

Figure 1:
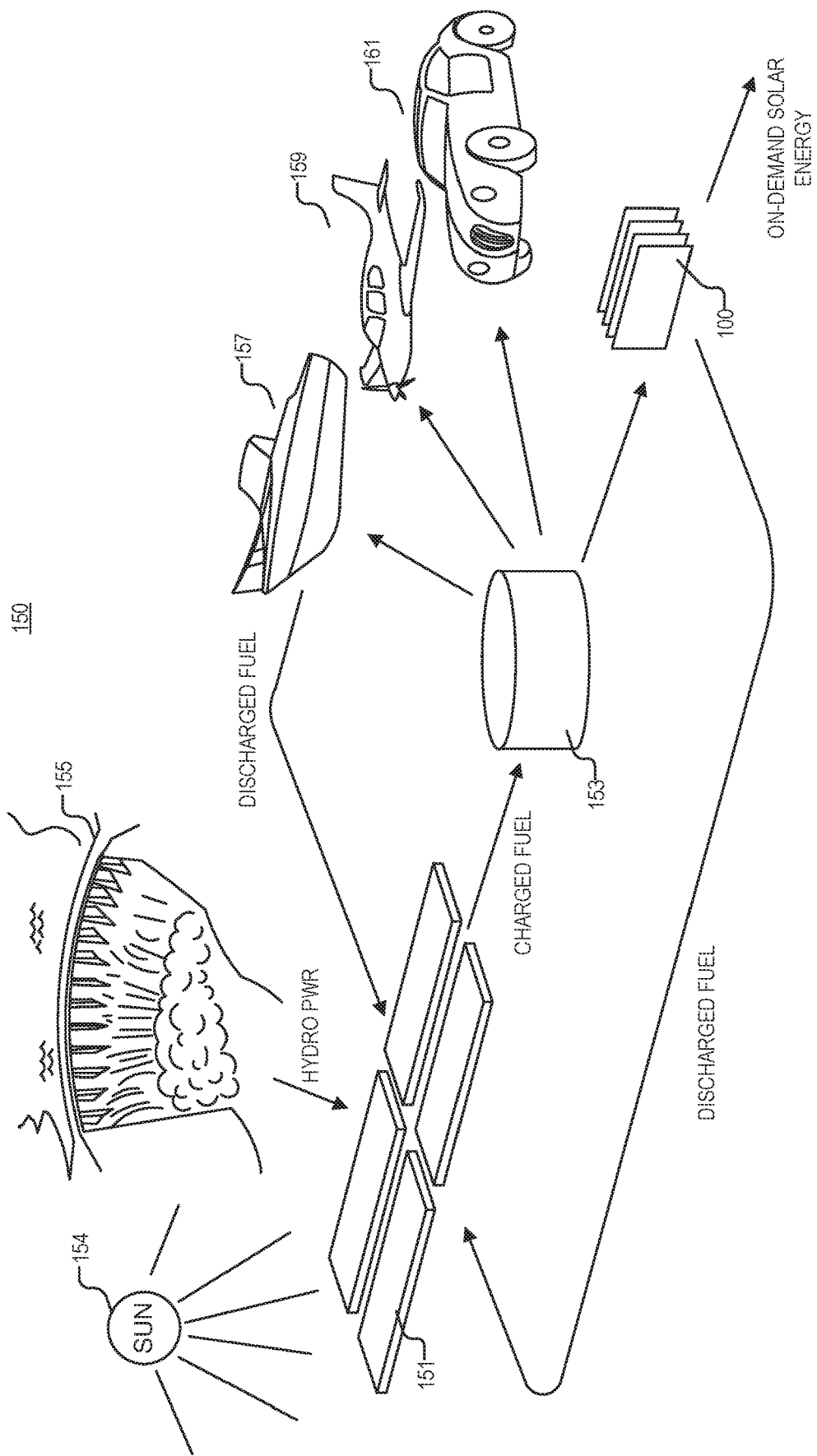
FIG. 1 is an illustration of part of a system for photofuel charging and use, in accordance with an embodiment of the disclosure.

Embodiments of a system and method for photochemical storage and photovoltaic conversion of light are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Generally this disclosure relates to a new paradigm in large-scale energy storage. The instant disclosure proposes releasing stored chemical energy as light—referring to the one or more light-releasing compounds (and their carrier solvents, stabilizers, and other compounds in the mixture) as "photofuel"—and then efficiently converting this emitted light to electricity using photovoltaics. Several families of multi-molecule and single-molecule chemical reactions are promising photofuel candidates, (e.g., delayed fluorescence, chemiluminescent/bioluminescent reactions, etc.). These molecules may be placed in a "photovoltaic reactor" (e.g., any device to convert the emitted light to electricity) to convert emitted light into electricity.

The disclosure herein provides economical solutions for both sustainable, low-cost, high energy density transportation fuel (including aviation fuel), and a way to achieve on-demand, low-cost solar energy. For transportation, photofuel may be capable of high energy density (>400 Wh/kg—exceeding today's batteries), can be easily recharged (either electrochemically, thermochemically, or photochemically), may not release $CO_2$ on net, may be capable of high vehicle refueling rates (e.g., by pumping the charged photofuel into a tank), and may be inexpensive due to current bulk chemical synthesis capabilities.

For solar generation, this disclosure offers a compelling way to concentrate and store sunlight, enabling low-cost storage and extremely efficient conversion to electricity by photovoltaics—e.g., by choosing a PV material with a bandgap matched to the near-monochromatic, high-intensity emission of the photofuel. In short, this disclosure contemplates "charging" of photofuel by sunlight (or other light sources, electrochemical systems, etc.) in low cost pools, pumping of the photofuel to storage tanks, and luminescent discharge of photofuel in high-power-density "photovoltaic reactors" to power vehicles or to power the electrical grid.

Below is a description of the embodiments discussed above, as well as other embodiments, as they relate to the figures.

FIG. 1 is an illustration of part of a system 150 for photofuel charging and use, in accordance with an embodiment of the disclosure. Depicted are photofuel charging pods 151, storage tank 153, photovoltaic power source 100, a boat 157, an aircraft 159, and a vehicle 161.

In the illustrated embodiments, charging pods 151 are configured to receive energy (e.g., from the sun 154 or a power source like a hydroelectric dam 155) to charge the photofuel when the photofuel is within the charging pods. The energy provided to charge the photofuel allows the photofuel to later emit light (during discharge). In some embodiments (like the one depicted), the photofuel may have a chemical composition such that it can absorb the sun's rays, and convert the absorbed solar photons into chemical potential energy (e.g., excite an electron into a high-energy state, induce a photochemical reaction, transform an isomer, etc.). The photofuel may be designed to have a wide absorption spectrum (e.g., including visible and non-visible portions of the solar spectrum) but a relatively narrow emission spectrum (e.g., substantially monochromatic light). In the depicted embodiment, in order to absorb sunlight, at least part of the charging pods 151 are transparent to the portion of the solar spectrum that will induce a "charging" chemical reaction in the photofuel. Charging pods 151 may be positively or negatively pressurized, and may include an inert environment (e.g., $N_2$, Ar, or the like) to prevent degradation of the photofuel due to chemical reaction with compounds in the air.

In some embodiments (like the one depicted), the chemical potential energy may be supplied through electricity or other forms of energy (e.g., heat). This may be from a power source like a hydroelectric dam (e.g., the dam depicted), in which case the photofuel may undergo the transformation to an increased potential energy state by virtue of applying an electric potential (e.g., via electrodes, or the like) to the photofuel or applying heat to the photofuel via a heater (e.g., an inductive heater, or the like). Photofuel "charge" mechanisms may include direct excitation of single molecule with light or photolysis, electrical/electrochemical excitation of single molecule, various chemical syntheses (e.g. electrochemical, thermochemical), or the like.

As shown, discharged photofuel may be returned to charging pods 151 for recharging, in embodiments where the charge-discharge chemical reactions in the photofuel are reversible.

After the photofuel is charged, the photofuel may be transferred to storage tank 153 where it may be stored for hours to months depending on the chemical composition of the fuel and the conditions within storage tank 153. Storage tank 153 may be coupled (via pipes or the like) to the one or more charging pods 151. It is appreciated that storage tank 153 may employ techniques to extend the working lifetime of the photofuel such as cooling the tank (e.g., with thermoelectric coolers, or the like), and include systems to maintain a relatively constant pH in tank 153. The tank 153 may possess mirrored walls such that any prematurely-emitted light may be reabsorbed to recharge the photofuel without significant loss. The tank 153 may be opaque so the photofuel is not exposed to light, which may prevent degradation of the molecules. Conversely light may be permitted to enter storage tank 153 in order to keep the molecules in the photofuel in their energized state. Storage tank 153 may be positively or negatively pressurized and may include an inert environment (e.g., $N_2$, Ar, or the like) to prevent degradation of the photofuel due to chemical reactions with molecules in the air. Storage tank 153 may also be devoid of materials that could act as a catalyst to the photofuel.

As shown, the photofuel may be output into photovoltaic power source 100 (contained within a receptacle, depicted elsewhere) which may be used as a general power source (e.g., for buildings on the power grid), but may be disposed within the hull/body/chassis of boat 157, aircraft 159, or vehicle 161, and used to power an electric motor in boat 157, aircraft 159, or vehicle 161. Thus, the vehicles depicted can use the photofuel as a power source to propel them. It is appreciated that the photofuel may be more attractive than other kinds of fuel because (1) conversion of light to electrical energy has become very efficient and inexpensive with advances in solar technology; (2) the fuel may be reusable (e.g., charged many times); (3) the fuel may be able to be stored for extended periods of time before use, thus there may be little to no loss associated with transferring the energy within the fuel over long distances (e.g., via pipes, or the like); and (4) as will be shown, the power source may have very few or no moving parts, which results in a long component lifetime.

FIGS. 2A and 2B illustrate embodiments of a photovoltaic power source 200A and 200B, in accordance with an embodiment of the disclosure. More specifically, FIG. 2A depicts a cross section of a photovoltaic power source 200A including a receptacle 201 (with one or more input ports and one or more output ports), one or more photovoltaic cells 205, one or more catalysts 203, power circuitry 211 (including power storage unit 213, controller 231, and power converter 215), and electric motor 219.

As illustrated, receptacle 201 is positioned to receive a photofuel including a liquid, and one or more photovoltaic cells 205 are positioned within receptacle 201 to receive light emitted from the photofuel, when the photofuel is in receptacle 201. Power circuitry 211 is coupled (e.g., with one or more cables/wires) to one or more photovoltaic 205 cells to receive a photocurrent generated by one or more photovoltaic cells 205 when one or more photovoltaic cells 205 receive the light emitted from the photofuel. In response to the photocurrent, power circuitry 205 is coupled to filter the photocurrent and output a DC waveform (which may be used to power electric motor 219 or other electronic components).

In the depicted embodiment, the photofuel flows into receptacle 201 continuously through the one or more input ports, and exits receptacle 201 continuously via the one or more output ports. Thus, there is a continuous flow of photofuel through receptacle 201. As shown, one or more channels are formed in receptacle 201 to receive the photofuel from the one or more input ports, and the one or more photovoltaic cells 205 line the walls of the channels to receive the light emitted from the photofuel. In the depicted embodiment, the channels are formed by substantially parallel (e.g., ±10° of rotation) plates, where some of the parallel plates are the one or more photovoltaic cells 205 themselves, and some of the plates are coated with, or include, a catalyst 203. This is because in some embodiments, the photofuel may emit light in the presence of catalyst 203. By having the photofuel snake through an extensive network of channels, the photofuel is exposed to a maximum surface area of photovoltaic cells 205 and catalyst 203. Thus, all (or nearly all) of the light will be discharged from the photofuel and absorbed by the photovoltaic cells 205. Similarly, in the depicted embodiment, since the reaction to produce the light from the photofuel may require, or be enhanced in the presence of, catalyst 203, the extra surface area of catalyst 203 in the channels will increase exposure to the photofuel and result in additional light output from the photofuel. In some embodiments, catalyst 203 could include floating particles (e.g., colloidal, suspended and homogenized via brownian motion), which do not exit reactor volume by fine screen filtration or the like). Similarly, the reactor may be heated to increase reaction kinetics.

In the depicted embodiment, one or more photovoltaic cells 205 are electrically coupled to power circuitry. The power circuitry includes a power storage 213 unit and power converter 215 to output a DC waveform. The power storage unit 213 may include one or more capacitors, an ultracapacitor, batteries or the like, to receive the unfiltered electrical output from one or more photovoltaic cells 205. It is appreciated that the electrical output from one or more photovoltaic cells 205 may be variable due to rate of flow of photofuel through receptacle 201, kinetic variations in the light production reaction (e.g., caused by temperature), or the like. Accordingly, storage unit 213 may be used as a power filter. The electrical charge contained in storage unit 213 may then be accessed by a power converter 215, which may output smooth consistent power DC waveform (e.g., a flat 5, 10, 20, 50 V). Power converter 125 may include one or more switches (e.g., MOSFETs, GaN high-voltage switches, or the like) as well as diodes, inductors, and resistors to access power in power storage unit 213. In some embodiments, power converter 215 may include a controller 231 to control the DC waveform output from power circuitry 211. For example, controller 231 may determine when to turn on/off a power switch in the power converter.

The DC waveform may be output from the power circuitry 211 to an electric motor 219. Electric motor 219 is disposed within, and electric motor 219 may be mechanically coupled to provide the mechanical energy to move one of an aircraft body, a boat hull, or a vehicle chassis (see e.g., FIG. 1). In one embodiment, power circuitry 211 may be coupled to other devices (e.g., lighting, microelectronics, or the like). It is appreciated that the photovoltaic power sources depicted may include thermal management functionality such as radiator for photofuel waste heat discharge. For example, cooling channels with separate cooling fluid or cold air may be circulated and heat rejected through radiator to the environment. In some embodiments, the reactors may be coupled to "pre emission" chambers for thoroughly mixing photofuel and getting reaction primed, or even getting the reaction started. Additionally, in one or more embodiments, the reactors may include safety mechanisms to catch photofuel in event of rupture (e.g., secondary containment receptacle holding the reactor, a drip pan, or the like).

FIG. 2B depicts a cross section of another embodiment of photovoltaic power source 200B including two receptacles 201. In the depicted embodiment, there may or may not be a continuous flow through the two receptacles 201. In the embodiment where the photofuel flow is not continuous, one receptacle 201 is used to harvest power while the other receptacle 201 is being drained or filled. Thus, the two receptacles 201 harvest power out of phase with each other—similar to how gas engine cylinders fire out of phase to provide relatively constant power production. This may be useful in instances where the photofuel emits light when triggered by incident photons (or other energy transition), which causes the light to be emitted suddenly and simultaneously. For example, the mechanism of light emission from the photofuel may be delayed florescence. Electrons in a high energy state in the fuel may exist in an energy band that does not permit a transition to the ground state unless the electrons are excited into another energy state (see e.g., FIG. 4B). Here, a laser 233 (or other light source such as a diode) is provided to act like an "optical spark plug" in order to induce florescence of the photofuel. In this embodiment, controller 231 in power circuitry 211 includes logic that when executed by controller 231 causes the photovoltaic power source 200B to perform operations such as causing one of lasers 233 to emit laser light out of phase from the other laser 233. The laser light may cause molecules in the receptacle 201 to emit light (possibly through a cascade effect). Controller 231 may also inform photovoltaic power source 200B when to fill/drain the receptacles 201 with photofuel (e.g., by controlling pumps and valves). In some embodiments, the photofuel reactor may have "starter subsystems" or "dark start subsystems" (e.g., a small gravity fed subsystem which produces enough energy to start up the larger photofuel reactor system in the event of a total dark start or absence of other energy source). It is appreciated that laser 233 may be substituted for thermal sparkplugs (e.g., resistive heaters, or the like for reactions that are activated by thermal energy) or pH spark plugs (e.g., a valve that lets in acid/base to initiate the reaction).

One of ordinary skill in the art will appreciate that FIGS. 2A and 2B merely show two examples of how to fabricate a photovoltaic power source, and that other device architectures in accordance with the teachings of the present disclosure are contemplated depending on the molecular design of the photofuel and other considerations.

FIGS. 3A-3F illustrate channels that may be used to direct flow of the photofuel in the photovoltaic power sources of FIGS. 2A and 2B, in accordance with embodiments of the disclosure. It is appreciated that the architectures depicted may be combined in any suitable manner, in accordance with the teachings of the present disclosure.

FIG. 3A shows cylindrical channels that are coated on the inside with photovoltaic cells 305 and/or catalysts. The tube geometry (e.g., interior diameter, length, etc.) may be tailored based on the time that the photofuel emits light once it is activated, the re-absorption of emitted light by the photofuel, the volume of the receptacle for a particular application, etc. In some examples, the length of the channel corresponds to the flow rate of the photofuel and the light emission lifetime (e.g., how long the photofuel emits light once activated). Thus, by the time the photofuel reaches the end of the channel, the photofuel has expended the vast majority (e.g., 80%-100%) of the photofuel's usable potential energy as light. In other instances, the diameter may be narrow when the photofuel has a high re-absorption (e.g., the photofuel reabsorbs a high number of the photons it produces). In this embodiment, the diameter may be configured so that 80%-100% of photons generated in the center of the channel reach the photovoltaic cells 305 without being reabsorbed by the photofuel.

FIG. 3B shows similar channel architecture as FIG. 3A; however, FIG. 3B shows that the photofluid flows through a smaller channel 333, which is disposed within, and proximate to a center of, the photovoltaic cells 305. Photovoltaic cells 305 line the walls of a larger channel. Thus in the depicted example, air or another medium (e.g., liquid or vacuum) may separate the smaller channel 333 from photovoltaic cells 305. This architecture may be useful for capturing all of the photons emitted from the photofuel. For instance, if the photofuel has a high reabsorption rate, the channel that the photofuel travels through should be retentively narrow (e.g., channel 333). Once the light is emitted, it travels through the transparent walls of channel 333 and a substantially nonabsorptive medium to photovoltaic cells 305. Moreover, the emitted light may be totally internally reflected in the space between channel 333 and photovoltaic cells 305, resulting in more light being absorbed by photovoltaic cells 305. In some embodiments, bubbles may be injected into the photofuel if fuel has high absorbance; bubble's may have lower absorbance and allow for high flow rates in channels.

FIG. 3C illustrates fuel flow between stacked planar photovoltaic cells 305, with many possible variants. In one embodiment, photovoltaic cells 305 may be partially or fully immersed in the photofuel when the photofuel is in the reactor. Variants of the structure depicted include counterflow or tapered spacing (see e.g., FIGS. 3E and 3F), cylindrical (or half cylindrical) flow channels carved into the surface of photovoltaic cells 305, various antireflective coatings on the surface of photovoltaic cells 305 (e.g., surface textures, coatings with different indices of refraction than the photofuel, solve brewster angle, etc.), coating photovoltaic cells 305 with a dye to improve efficiency (e.g., excitation happens at photovoltaic surface, dye that acts as a catalyst, or a dye catalyst combination). In some embodiments, photovoltaic cells 305 may be optimized to eliminate shunt currents. Similarly, bifacial photovoltaic cells 305, or one photovoltaic cell 305 per channel and a mirrored wall may be employed. Since semiconductors are regularly fabricated on flat surfaces, planar photovoltaic cells 305 may be used to reduce costs in some embodiments. Photovoltaic cells 305 may be offset from each other to create channels that snake through the interior of the reactor to increase the length of the path that the fluid needs to traverse (see e.g., FIG. 2A where catalyst plates 203 and photovoltaic cells 205 are substantially parallel but every other plate is vertically offset from a wall of receptacle 201 to create a channel through receptacle 201). This staggering may increase the amount of surface area of photovoltaic cells 305 that the photofuel is exposed to. Photovoltaic cells 305 may be coupled in series or parallel to optimize electrical output for a given system (e.g., some in series and with groups of series cells in parallel, to achieve desired redundancy and voltages/currents).

Figure 3D:
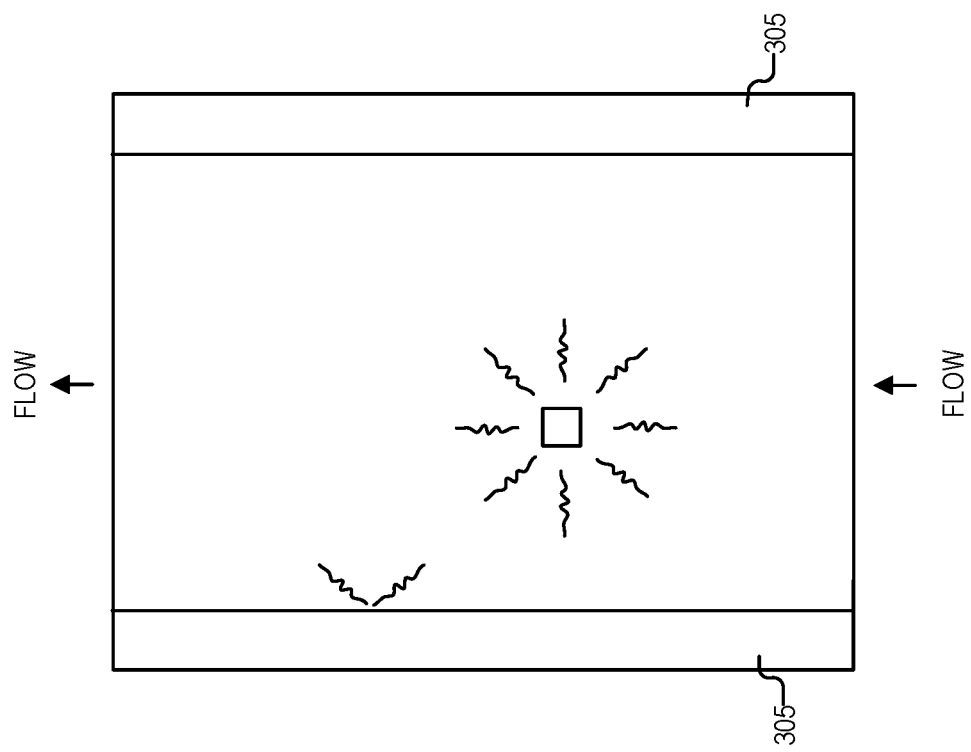

FIG. 3D shows one example of planar photovoltaic cells 305 where the photofuel is flowed between two photovoltaic cells 305 (which may be bifacial to accommodate multiple channels). The depicted embodiment may also be useful with the pulsed discharge embodiment (see e.g., FIG. 2B) where the reactor is filled with fuel and flow is stopped, the emission of all stored energy as light is triggered, discharged fuel is flowed out into a collection tank, and the cycle repeats.

Figure 3E:
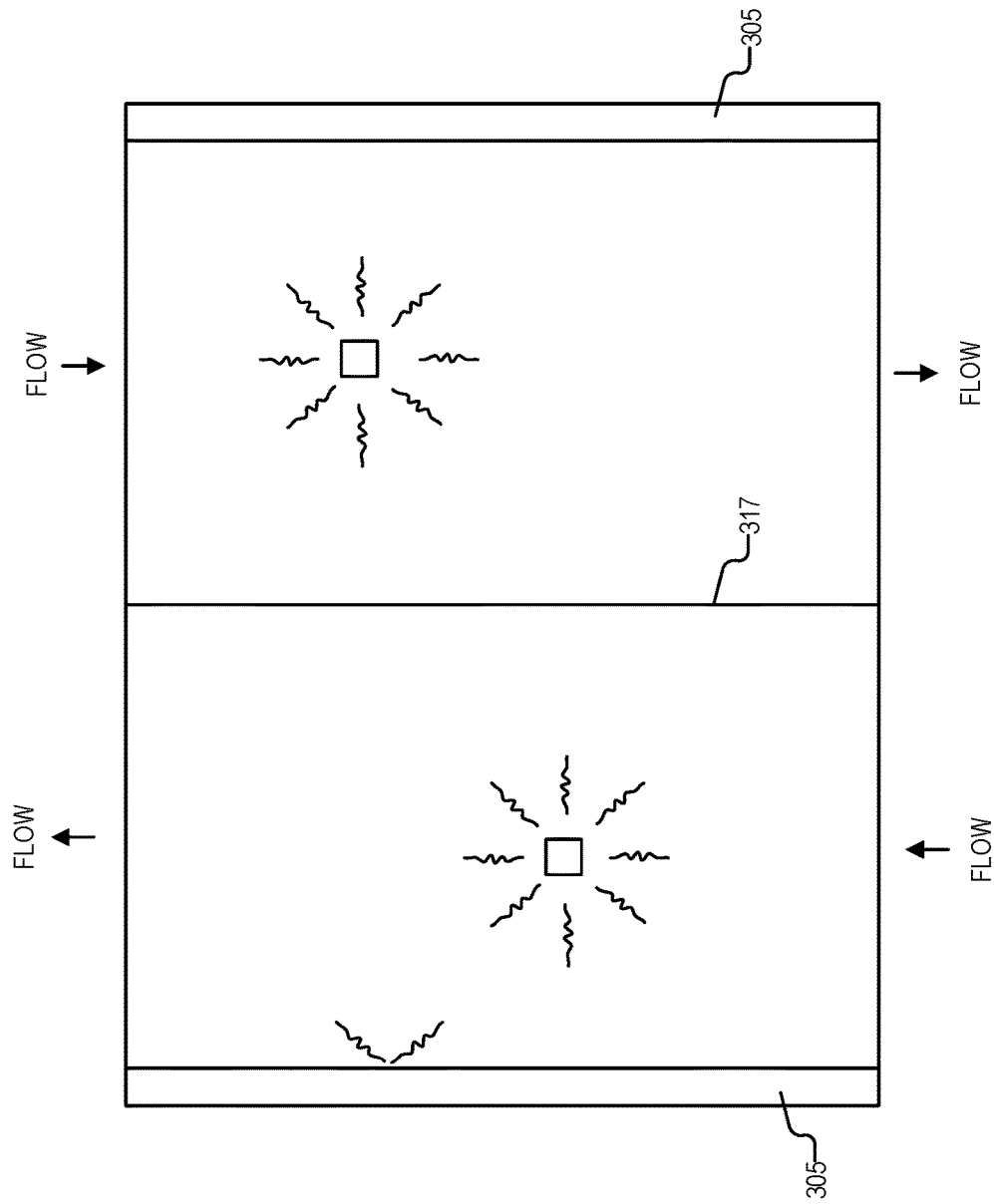

FIG. 3E depicts the one or more channels divided into a first sub channel and a second sub channel with a clear divider 317 disposed between the first sub channel and the second sub channel. As shown, photofuel flows in a first direction in the first sub channel, and photofuel flows in a second (opposite) direction in the second sub channel. The walls of the channel may be one or more photovoltaic cells 305. Put another way, one geometry for photofuel flow in a photovoltaic reactor is counterflow. This arrangement may be attractive in cases where fuel flows continuously through the reactor, where the light emission begins at the entry point to the reactor, light emission continues/diminishes as fuel proceeds through reactor, and light emission effectively ceases at the outlet. Assuming nearly-exhausted fuel does not significantly non-radiatively absorb emitted light, this counterflow configuration could help ensure that one or more photovoltaic cells 305 see approximately uniform light intensity at all points in the reactor, since light shines through the clear divider 317.

Figure 3F:
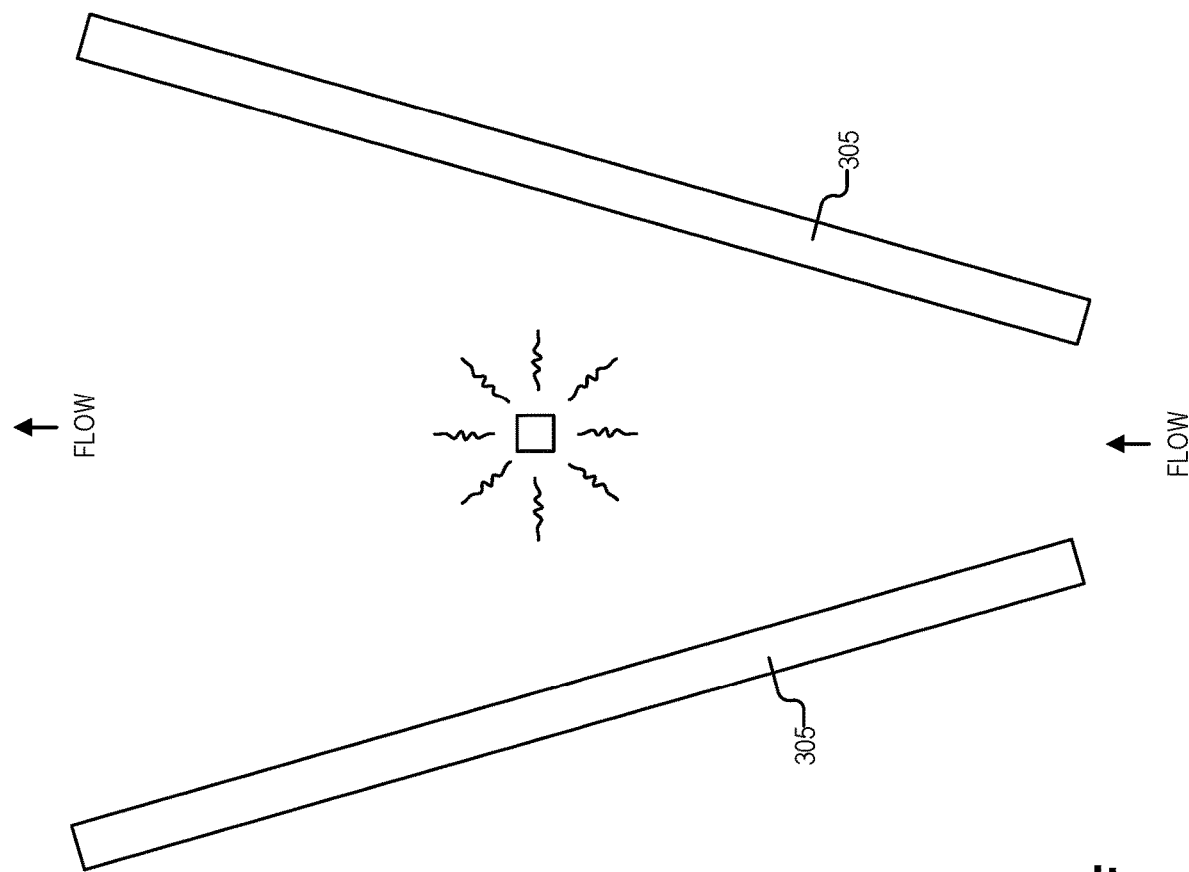

FIG. 3F depicts an embodiment where the one or more channels have a first end and a second end, and the first end is narrower than the second end. Put another way, FIG. 3F shows unidirectional continuous flow through a widening channel. This arrangement may be attractive in cases where photofuel continuously flows through the reactor, where light emission intensity begins at the inlet, diminishes quickly, and effectively ceases at the outlet. The particular geometry of how the reaction channel widens over time can be determined by the emission lifetime and fuel flow rate, to allow for uniform light intensity on the photovoltaic cells (e.g. by allowing a larger volume of dimmer, nearly-exhausted fuel to dwell for longer as the fuel proceeds through the reactor).

FIGS. 4A-4D illustrate chemicals and reaction mechanisms that may be used in the photofuel, in accordance with embodiments of the disclosure. It is appreciated that there are many ways to activate light emission, depending on the type of photofuel used for example: catalytic or enzymatic release of energy, which may or may not be used with a catalyst agent fixed near the surface of the photovoltaic cells (such that the reaction only happens while in the receptacle); thermal or optical activation (e.g., a "spark plug" type of initiation, which causes a local region to discharge light and propagates the reaction either optically or thermally); electrochemiluminescent reaction; pH initiation, or other chemical reaction; phase change (e.g., photofuel may be stored as a solid or liquid, and subsequently discharged in gas or liquid state, and may be mixed with other materials, such as gases, solvents, dyes, etc.); other on/off switches (e.g., electric or magnetic field, pressure). It is appreciated that biology inspired emission pathways (e.g., firefly luciferen emitting light via ATP and oxygen) may also be viable ways to produce a photofuel. As stated, photofuel may include light emitting molecules as well as solvents (which may be transparent), catalysts, reaction inducing chemicals, etc. Several embodiments are discussed below as they relate to the figures.

Figure 4B:
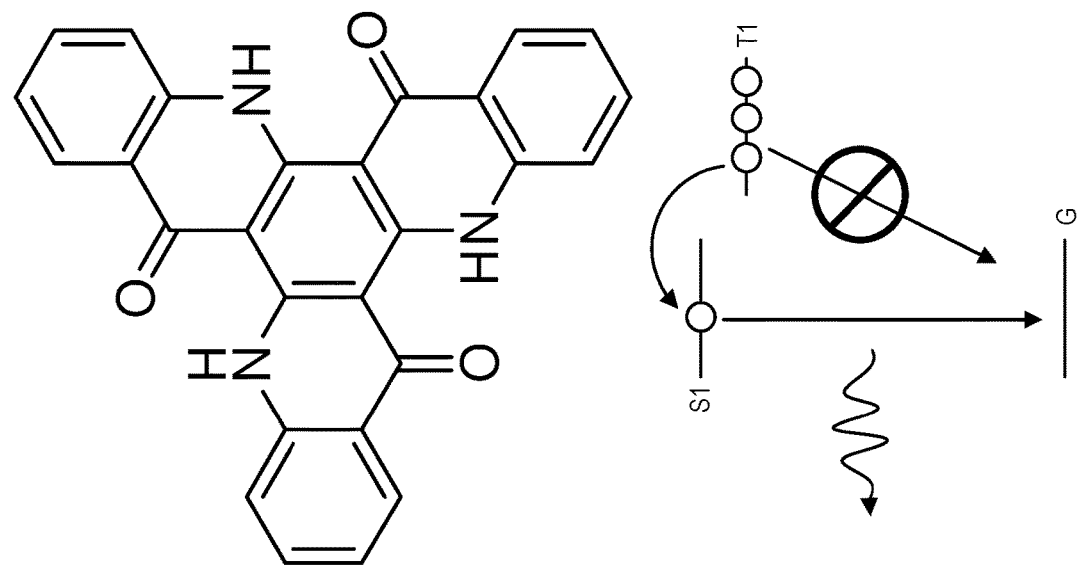
FIGS. 4A-4D illustrate chemicals and reaction mechanisms that may be used in the photofuel, in accordance with embodiments of the disclosure.
Figure 4A:
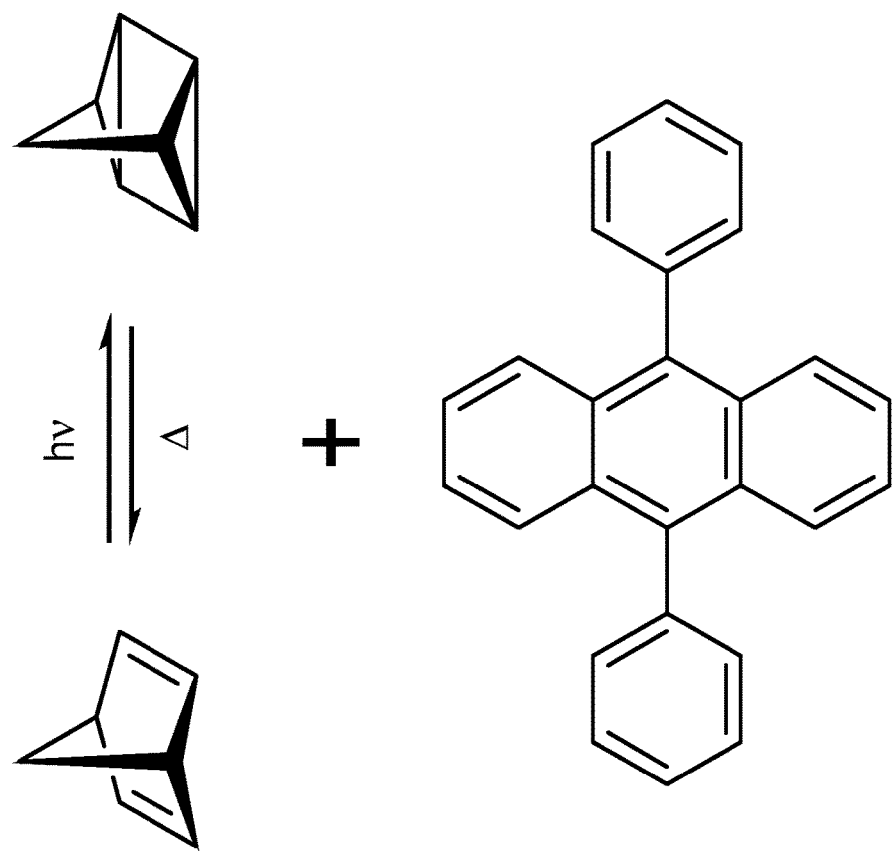

FIG. 4A shows one example of chemicals included in a photofuel. The reaction mechanism used to produce the light here is an optical isomer transformation (e.g., the transformation of optically-switched norbornadiene to quadricyclane) that could be built into a high quantum efficiency dye like 9, 10-diphenylanthracene (depicted). If a sufficiently high energy transformation is built into such a dye and efficiently release its energy via luminescence, the energy density of this type of reaction could match or exceed the chemistry of many battery technologies.

FIG. 4B depicts a delayed fluorescence reaction that is activated either thermally or with a metal catalyst. Depicted is a triquinolonobenzene molecule has a long lived a long-lived triplet state, which can be thermally excited for delayed fluorescence. Also depicted is an example band diagram for molecule (which may be similar to triquinolonobenzene in that it exhibits delayed fluorescence), that has an excited state (T1) and electrons in this state are forbidden from decaying directly to the ground state (G). Accordingly, in order for electrons in the excited state T1 to reach the ground state (G) and emit a photon, they must be excited to a different excited state (S1). Thus, the molecule could be charged (to get electrons into energy state T1), and then thermally or catalytically excited to get the electrons into energy state S1 where they will decay to the ground state and emit light.

Figures 4C, 4D:
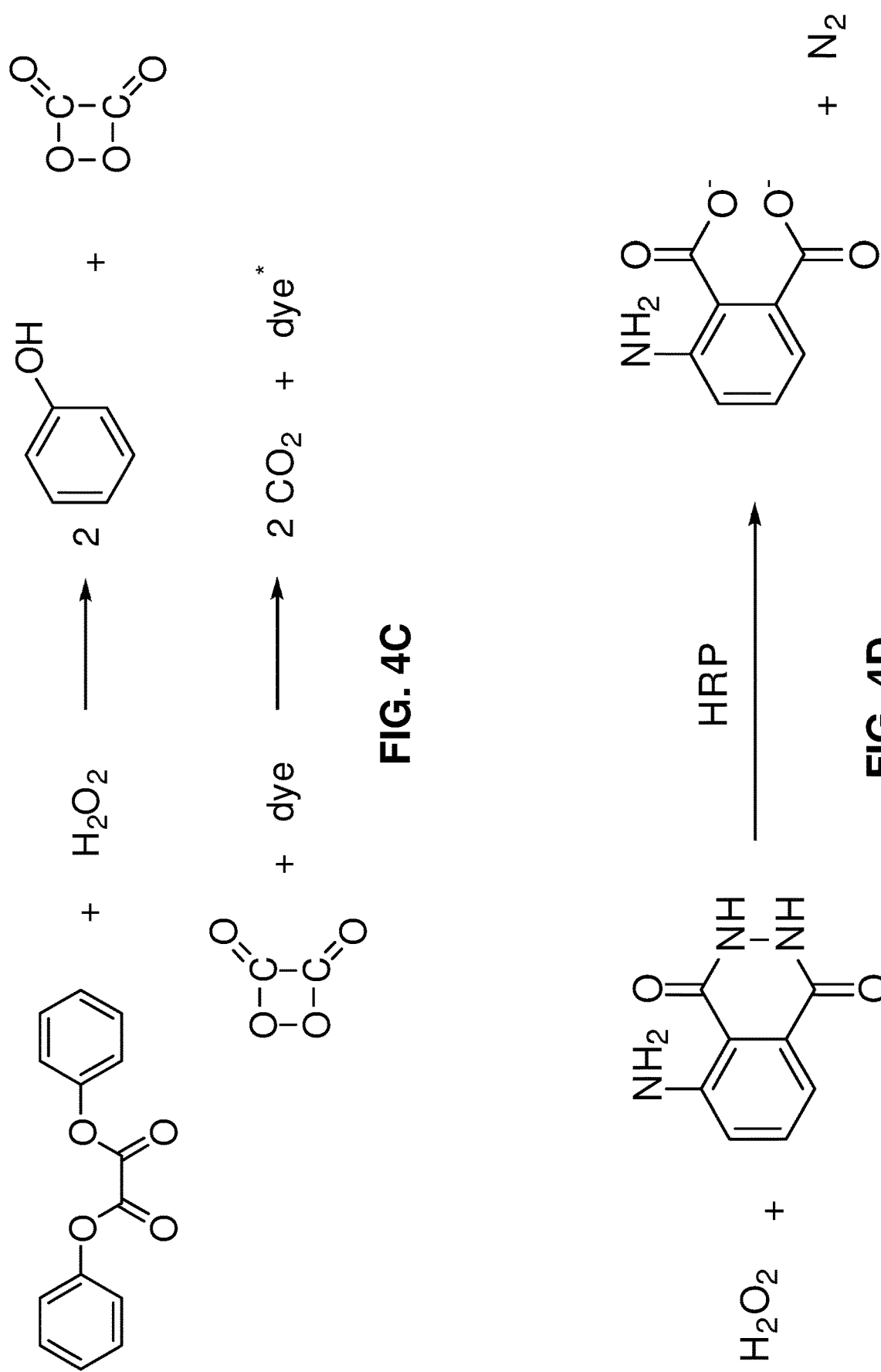

FIG. 4C shows a Cyalume reaction, where hydrogen peroxide ($H_2O_2$) oxidizes diphenyl oxalate to produce metastable 1,2-dioxetanedione, which then gives up its energy to excite a dye. The dye then relaxes by light emission.

FIG. 4D shows a horseradish-peroxidase-(HRP)-catalyzed luminescence reaction for luminol. It is appreciated that this is just one catalyst-type reaction that may be used to produce the light from the photofuel.

Figure 5:
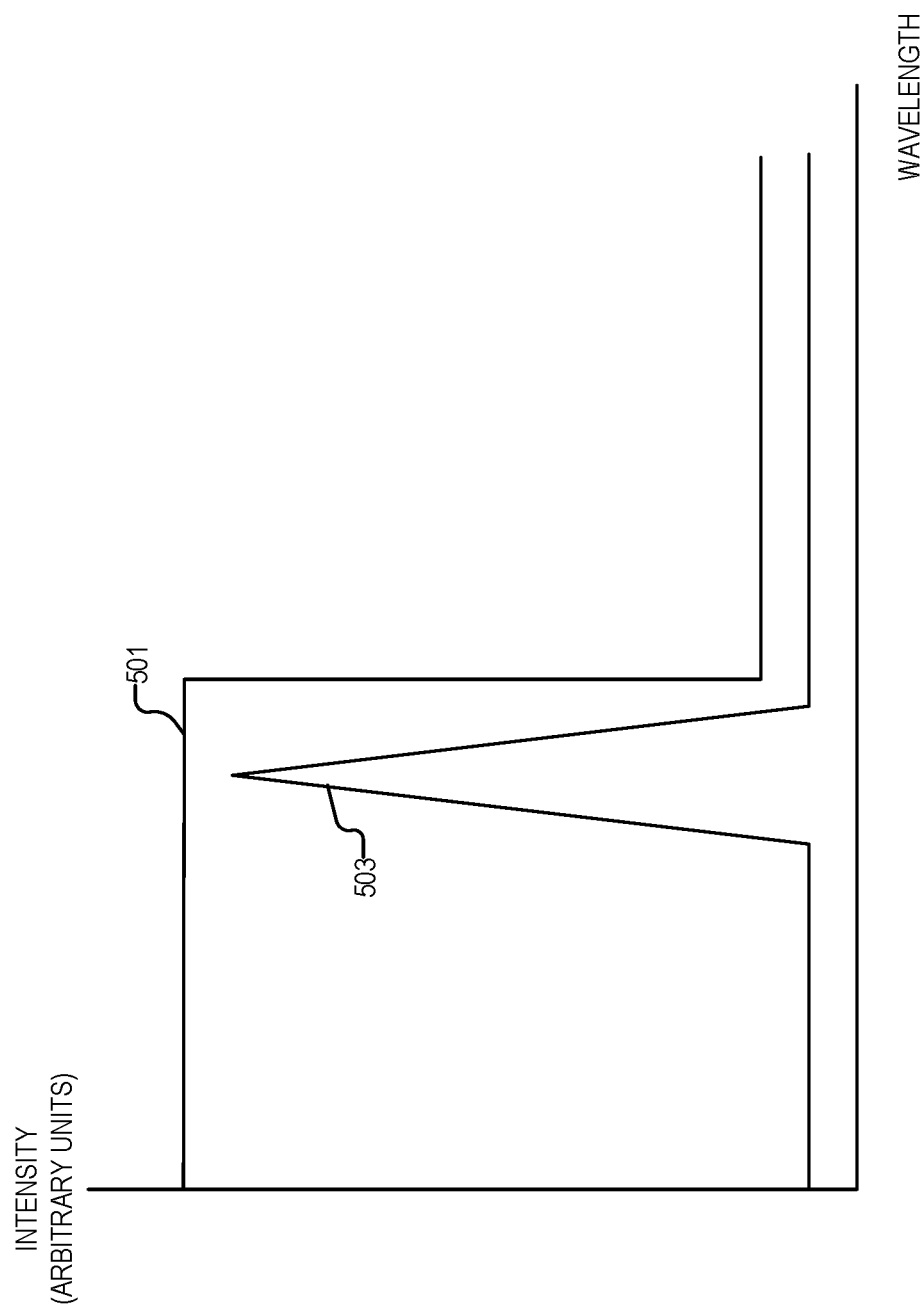
FIG. 5 illustrates an example absorption spectrum of photovoltaic cells and the emission spectrum of the photofuel, in accordance with embodiments of the disclosure.

FIG. 5 illustrates an example absorption spectrum of photovoltaic cells 501 and an example emission spectrum of the photofuel 503, in accordance with embodiments of the disclosure. As shown, the absorption spectrum of the one or more photovoltaic cells 501 overlaps the emission spectrum 503 of the photofuel. In the depicted embodiment, the photofuel may emit relatively monochromatic (e.g., ±5 nm from the emission peak) light. The solar cell may be fabricated to absorb all light that the photofuel emits. Since the photofuel may emit basically one wavelength of light, the photovoltaic cell may require less optimization than cells that capture sunlight since absorption of only one wavelength needs to be designed for. Thus, the photovoltaic cells in the reactor may be less expensive than high-efficiency tandem solar cells. For example, the photofuel may be designed to emit light at the absorption maxima or the absorption onset (e.g., to maximize internal voltage) of the photovoltaic cells. In some embodiments, the photofuel may have more than one emission peak; accordingly solar cell(s) with an absorption spectra that correspond to the emission peaks may be used.

Figure 6:
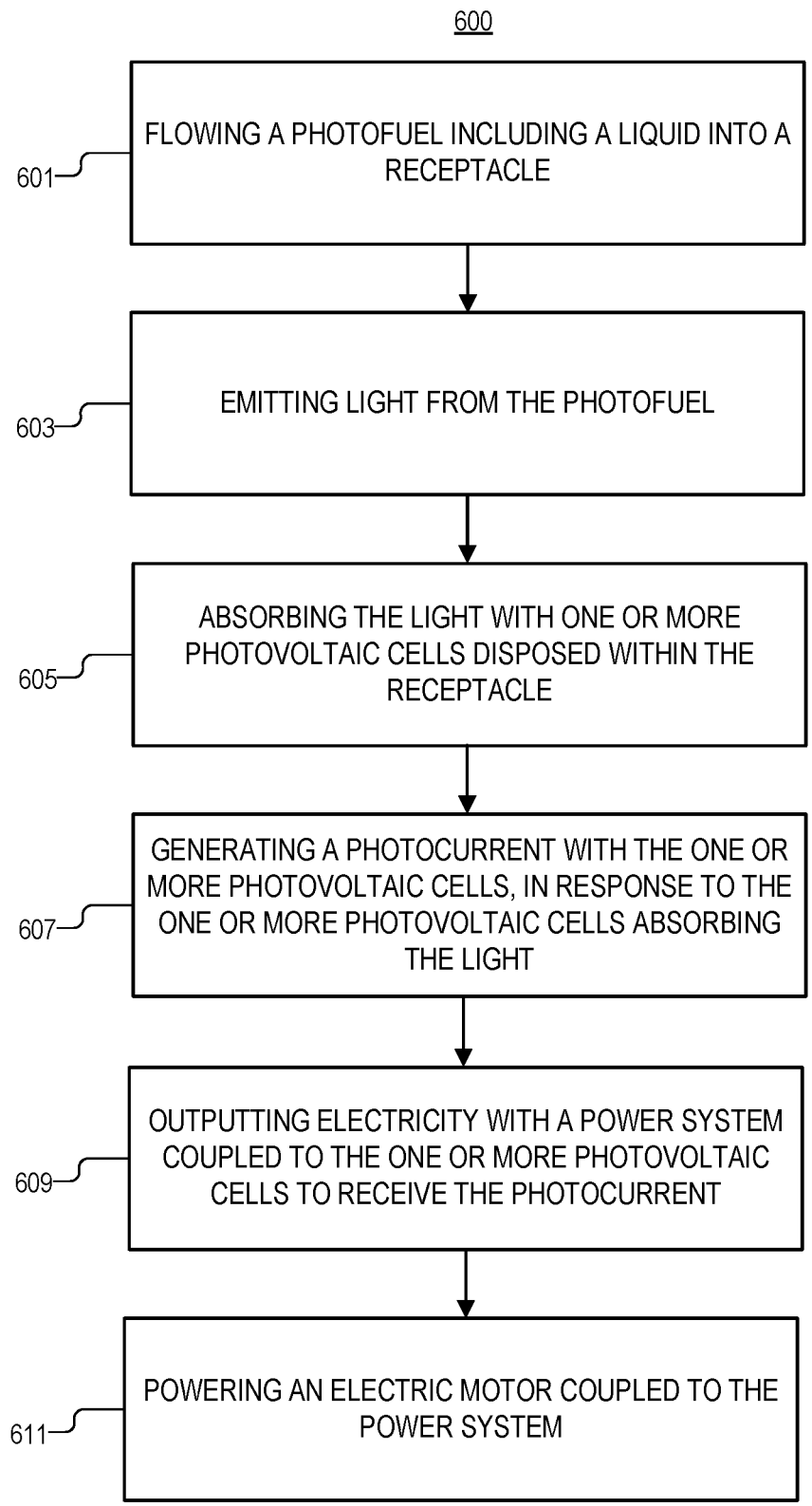
FIG. 6 illustrates a method for generating power, in accordance with an embodiment of the disclosure.

FIG. 6 is an illustration of method 600 for generating power, in accordance with an embodiment of the disclosure. The order in which some or all of process blocks 601-609 appear in method 600 should not be deemed limiting. Rather, one of ordinary skill in the art having the benefit of the present disclosure will understand that some of method 600 may be executed in a variety of orders not illustrated, or even in parallel. Additionally, method 600 may include additional blocks or have fewer blocks than shown, in accordance with the teachings of the present disclosure.

Block 601 illustrates flowing a photofuel including a liquid into a receptacle. It is appreciated that the receptacle can take any shape including a box, substantially parallel pipes/tubes, or the like. The photofuel may be pumped into and out of the receptacle via input and output ports, and a pump (e.g., a modified water or fuel pump) may be used to supply the fuel to the receptacle as needed. The pump may be coupled to a controller to control flow into the receptacle.

As depicted in FIG. 1 the photofuel may be charged with second light (e.g., sunlight) before flowing the photofuel into the receptacle. In other embodiments, the photofuel can be charged with other sources of energy such as electricity, heat, or the like.

Block 603 describes emitting light from the photofuel. The light emission process may be through any of the mechanisms identified in FIG. 4 and associated discussion, as well as other mechanisms not specifically described herein, in accordance with the teachings of the present disclosure.

Block 605 shows absorbing the light from the photofuel with one or more photovoltaic cells disposed within the receptacle. As shown elsewhere, the one or more photovoltaic cells may be fully or partially immersed in the photofuel (e.g., the photofuel could run through tubes with the photovoltaic cells on the walls of the tubes or the photovoltaic cells could include parallel plates and the photofuel flows over the plates, etc.). Thus, the photofuel may be continuously flowed though one or more channels positioned in the receptacle, where the photovoltaic cells are positioned in the channels to receive the light from the photofuel.

Block 607 illustrates generating a photocurrent with the one or more photovoltaic cells, in response to the one or more photovoltaic cells absorbing the light. In one embodiment, the light from photofuel generates hole-electron pairs in the photovoltaic cells which results in a photocurrent. It is appreciated that the photovoltaic cells may be any system that generates a photocurrent (e.g., Si-based photovoltaic cells, organic photovoltaic cells, CdTe photovoltaic cells, perovskite photovoltaic cells, any of the III-V or II-VI group solar cells, or the like).

Block 609 shows outputting electricity with a power system coupled to the one or more photovoltaic cells to receive the photocurrent. This may include the generating a DC waveform generated with a power storage unit (e.g., capacitor or the like) and power converter included in the power system.

Block 611 illustrates powering an electric motor coupled to the power system, where in response to receiving the electricity, the electric motor outputs mechanical energy. The electric motor may be used to move one of a boat hull, a vehicle chassis (e.g., car, truck, or the like), or an aircraft body with the mechanical energy.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A photovoltaic power system, comprising:
   a receptacle shaped to receive a photofuel including a liquid;
   a channel disposed within the receptacle for guiding or confining the photofuel within the receptacle;
   a catalyst lining at least a portion of the channel, wherein the catalyst encourages photoemission of light by the photofuel when in physical contact with the photofuel;
   one or more photovoltaic cells positioned within the receptacle to receive the light emitted from the photofuel when the photofuel is in the receptacle; and
   power circuitry coupled to the one or more photovoltaic cells to receive a photocurrent generated by the one or more photovoltaic cells when the one or more photovoltaic cells receive the light emitted from the photofuel, wherein in response to the photocurrent, the power circuitry is coupled to output electricity.

2. The photovoltaic power system of claim 1, wherein an absorption spectrum of the one or more photovoltaic cells positioned in the receptacle overlaps an emission spectrum of the photofuel, at least in part, and wherein the catalysts and the photovoltaic cells are disposed on opposing sides of the channel facing each other.

3. The photovoltaic power system of claim 1, wherein the power circuitry includes a power storage unit coupled to receive the photocurrent from the one or more photovoltaic cells, and a power converter coupled to the power storage unit to output a DC waveform.

4. The photovoltaic power system of claim 1, further comprising:
   one or more input ports to the receptacle, wherein the receptacle receives the photofuel through the one or more input ports; and
   one or more output ports from the receptacle, wherein the receptacle outputs the photofuel through the one or more output ports.

5. The photovoltaic power system of claim 4, wherein the one or more input ports continuously receives the photofuel and the one or more output ports continuously outputs the photofuel from the receptacle, while the photovoltaic power system is operating.

6. The photovoltaic power system of claim 1, wherein the receptacle comprises a first receptacle, the photovoltaic power system further comprising:
   a second receptacle to receive the photofuel; and trigger mechanisms coupled to the first and second receptacles and configured to spark out-of-phase photoemissions of the light between the first and second receptacles.

7. The photovoltaic power system of claim 6, wherein the trigger mechanisms for sparking the out-of-phase photoemissions of the light between the first and second receptacles each comprise one of a valve for controlling pH of the photofuel, a laser, or a heater.

8. The photovoltaic power system of claim 1, wherein the channel comprises a gradually widening portion that widens in a direction of a flow of the photofuel through the channel to gradually slow a progression of the photofuel through the gradually widening portion as the channel widens, and wherein the solar cells are lined along the gradually widening portion.

9. The photovoltaic power system of claim 1, wherein the channel is divided into a first sub channel and a second sub channel, wherein a clear divider is disposed between the first sub channel and the second sub channel, and wherein the photofuel flows in a first direction in the first sub channel and the photofuel flows in a second direction in the second sub channel, wherein the first direction is opposite the second direction.

10. The photovoltaic power system of claim 1, wherein the photofuel emits light through at least one of an isomer transformation, an electrochemiluminescent reaction, a chemiluminescent reaction, or delayed fluorescence.

11. The photovoltaic power system of claim 1, further comprising an electric motor coupled to the power circuitry to receive the electricity and convert the electricity into mechanical energy.

12. The photovoltaic power system of claim 11, wherein the receptacle, the power circuitry, and the electric motor are disposed within, and the electric motor is mechanically coupled to provide the mechanical energy to move, one of an aircraft body, a boat hull, or a vehicle chassis.

13. The photovoltaic system of claim 1, further comprising one or more charging pods configured to receive energy to charge the photofuel when the photofuel is within the charging pods, wherein the energy provided to charge the photofuel allows the photofuel to emit the light.

14. The photovoltaic system of claim 13, further comprising one or more storage tanks coupled to the charging pods to receive the photofuel after the photofuel has been charged, and wherein the one or more storage tanks is configured to output the photofuel to the receptacle.

15. A method for generating power, comprising:
receiving a photofuel, including a liquid, with a receptacle including one or more photovoltaic cells disposed within the receptacle;
emitting light from the photofuel when the photofuel is in the receptacle;
flowing the photofuel though a channel positioned in the receptacle, wherein the photovoltaic cells are positioned in the channel to receive the light from the photofuel, wherein at least a portion of the channel is lined with a catalyst that encourages photoemission of the light by the photofuel when in physical contact with the photofuel;
absorbing the light with the one or more photovoltaic cells disposed within the receptacle;
generating a photocurrent with the one or more photovoltaic cells, in response to the one or more photovoltaic cells absorbing the light; and
outputting electricity with a power system coupled to the one or more photovoltaic cells to receive the photocurrent.

16. The method of claim 15, further comprising powering an electric motor coupled to the power system, wherein in response to receiving the electricity the electric motor outputs mechanical energy.

17. The method of claim 16, further comprising moving one of a boat hull, a vehicle chassis, or an aircraft body with the mechanical energy output from the electric motor.

18. The method of claim 15, further comprising charging the photofuel with second light before flowing the photofuel into the receptacle.

19. The method of claim 15, wherein the electricity includes a DC waveform generated by a power storage unit and power converter included in the power system.

20. The method of claim 15, wherein emitting the light from the photofuel includes emitting the light through at least one of an isomer transformation, a chemiluminescent reaction, an electrochemiluminescent reaction, or delayed fluorescence.

21. The method of claim 15, wherein absorbing the light with the one or more photovoltaic cells includes using the one or more photovoltaic cells having an absorption spectrum that overlaps an emission spectrum of the photofuel, at least in part.

22. The method of claim 15, wherein flowing the photofuel into the receptacle includes immersing the one or more photovoltaic cells in the photofuel, at least in part.

23. A photovoltaic power system, comprising:
a receptacle shaped to receive a photofuel including a liquid, wherein the receptacle includes a smaller inner channel and a larger outer channel that encircles the smaller inner channel and wherein the photofuel is confined to the smaller inner channel but not the larger outer channel;
one or more photovoltaic cells positioned within larger outer channel of the receptacle to receive light emitted from the photofuel through a transparent wall of the smaller inner channel to the one or more photovoltaic cells within the larger outer channel when the photofuel is in inner smaller channel of the receptacle; and
power circuitry coupled to the one or more photovoltaic cells to receive a photocurrent generated by the one or more photovoltaic cells when the one or more photovoltaic cells receive the light emitted from the photofuel, wherein in response to the photocurrent, the power circuitry is coupled to output electricity,
wherein a space between the transparent wall of the inner smaller channel and the one or more photovoltaic cells comprises a nonabsorptive medium that traps at least a portion of the light via total internal reflection from reentering the inner smaller channel after passing through the transparent wall.

24. A photovoltaic power system, comprising:
a first receptacle shaped to receive a first photofuel;
a second receptacle shaped to receive a second photofuel, wherein the first and second photofuels comprise a liquid;
one or more photovoltaic cells positioned within the first and second receptacles to receive light emitted from the first or second photofuels when the first or second photofuel are in the first or second receptacles, respectively;

trigger mechanisms coupled to the first and second receptacles and configured to spark out-of-phase photoemissions of the light between the first and second receptacles; and power circuitry coupled to the one or more photovoltaic cells to receive a photocurrent generated by the one or more photovoltaic cells when the one or more photovoltaic cells receive the light emitted from the first or second photofuels, wherein in response to the photocurrent, the power circuitry is coupled to output electricity.

25. A photovoltaic power system, comprising:

a receptacle shaped to receive a photofuel including a liquid;

a channel disposed within the receptacle for guiding or confining the photofuel within the receptacle, wherein the channel is divided into a first sub channel and a second sub channel, wherein a clear divider is disposed between the first sub channel and the second sub channel, and wherein the photofuel flows in a first direction in the first subchannel and the photofuel flows in a second direction in the second sub channel, wherein the first direction is opposite the second direction;

one or more photovoltaic cells positioned within the receptacle to receive the light emitted from the photofuel when the photofuel is in the receptacle; and power circuitry coupled to the one or more photovoltaic cells to receive a photocurrent generated by the one or more photovoltaic cells when the one or more photovoltaic cells receive the light emitted from the photofuel, wherein in response to the photocurrent, the power circuitry is coupled to output electricity.

* * * * *